(12) United States Patent
Prouteau et al.

(10) Patent No.: US 9,976,480 B2
(45) Date of Patent: May 22, 2018

(54) FLUID INTAKE SYSTEM

(71) Applicant: SNECMA, Paris (FR)

(72) Inventors: Jackie Raymond Julien Prouteau, Villecresnes (FR); Pierrick Mouchoux, Paris (FR)

(73) Assignee: SNECMA, Paris (FR)

( * ) Notice: Subject to any disclaimer, the term of this patent is extended or adjusted under 35 U.S.C. 154(b) by 152 days.

(21) Appl. No.: 14/566,916

(22) Filed: Dec. 11, 2014

(65) Prior Publication Data

US 2015/0167552 A1    Jun. 18, 2015

(30) Foreign Application Priority Data

Dec. 16, 2013  (FR) ..................... 13 62684

(51) Int. Cl.
*F02C 1/00*  (2006.01)
*F02C 7/04*  (2006.01)
(Continued)

(52) U.S. Cl.
CPC ............... *F02C 7/04* (2013.01); *B60H 1/30* (2013.01); *B60K 11/08* (2013.01); *B64D 13/00* (2013.01); *B64D 33/02* (2013.01); *B64D 33/08* (2013.01); *F02C 7/18* (2013.01); *B60Y 2200/50* (2013.01); *B60Y 2200/51* (2013.01);
(Continued)

(58) Field of Classification Search
CPC .. B64D 33/02; B64D 2033/024; B64D 13/00; B64D 13/006; B64D 2033/0226; B64D 2033/0253; B64D 2033/026; B64C 21/06; B64C 21/08; B64C 2230/20; B64C 2230/22; F02C 7/04; F02C 7/057
See application file for complete search history.

(56) References Cited

U.S. PATENT DOCUMENTS 2,993,513 A     7/1961  Hyde
5,299,760 A *   4/1994  Finch ..................... B64D 33/02
                                                 244/53 B
(Continued)

FOREIGN PATENT DOCUMENTS

DE    10 2006 003 138      8/2007
DE    102010014354 A1 * 10/2011 ............. B64D 13/00
(Continued)

OTHER PUBLICATIONS

NACA Duct, Nov. 18, 2012.*
(Continued)

Primary Examiner — Pascal M Bui Pho
Assistant Examiner — Edwin Kang
(74) Attorney, Agent, or Firm — Oblon, McClelland, Maier & Neustadt, L.L.P.

(57) ABSTRACT

A fluid intake system including a fluid collector scoop designed to be fastened on an inside surface of a wall in order to collect the fluid flowing on the outside of the wall; and an extraction duct suitable for directing the fluid from an inlet orifice into the duct to at least one outlet orifice from the duct, is provided. The scoop is arranged so as to direct the collected fluid towards the inlet orifice of the extraction duct. In this system, at least one outlet orifice is of substantially elliptical section with a ratio of the major diameter of the ellipse over its minor diameter being greater than 1.5.

7 Claims, 3 Drawing Sheets

(51) Int. Cl.
- *F02C 7/18* (2006.01)
- *B60K 11/08* (2006.01)
- *B64D 13/00* (2006.01)
- *B64D 33/02* (2006.01)
- *B64D 33/08* (2006.01)
- *B60H 1/30* (2006.01)

(52) U.S. Cl.
CPC .. *B64D 2033/0213* (2013.01); *B64D 2241/00* (2013.01); *Y10T 137/0536* (2015.04)

(56) References Cited

U.S. PATENT DOCUMENTS

| | | |
|---|---|---|
| 5,513,591 A | 5/1996 | Quartarone et al. |
| 2010/0192616 A1* | 8/2010 | Gores .................... B64D 13/00 62/408 |
| 2013/0269354 A1* | 10/2013 | Starkweather ............ F23R 3/06 60/754 |

FOREIGN PATENT DOCUMENTS

| | | |
|---|---|---|
| WO | WO 94/01735 | 1/1994 |
| WO | WO 2005/063569 A1 | 7/2005 |
| WO | WO 2007/037725 A1 | 4/2007 |
| WO | WO 2012/049500 A1 | 4/2012 |

OTHER PUBLICATIONS

Ridgeway, Todd, Cooling Systems—Staying Cool When the Action Heats Up, Aug. 20, 2012.*

French Preliminary Search Report dated Aug. 6, 2014 in French Application 13 62684, dated Dec. 16, 2013 (with English Translation of Categories of Cited Documents).

* cited by examiner

FLUID INTAKE SYSTEM

BACKGROUND OF THE INVENTION

Field of the Invention

The invention relates to a fluid intake system comprising a fluid collector scoop designed to be fastened on an inside surface of a wall in order to collect the fluid flowing on the outside of the wall; and an extraction duct suitable for directing the fluid from an inlet orifice into the duct to at least one outlet orifice of the duct; the scoop being arranged so as to direct the collected fluid towards the inlet orifice of the extraction duct.

Description of the Related Art

Such a system is conventionally fastened to the wall of an airplane or more generally of a vehicle traveling at high speed. The collected fluid then serves to cool certain portions of the vehicle, in particular the engine.

On board vehicles, it is sometimes necessary to cool certain members that give off heat. This cooling may be performed in particular by using the fluid in which the vehicle is traveling as a cooling fluid, and in particular using ambient air for aircraft, e.g. for airplanes.

In order to collect ambient air, use is made in conventional manner of a collector that collects the fluid or air and directs it towards an orifice referred to as an "inlet" orifice. An extraction duct connected to this fluid inlet orifice then directs the fluid to an enclosure containing the part of the vehicle that needs to be cooled. The fluid is then injected into this enclosure via an outlet orifice of the extraction duct.

Generally, the duct is square or rectangular in section.

It has been found that at least part of the flow of fluid in the duct takes place in a manner that is strongly turbulent. This turbulence gives rise to large head losses; consequently, the cooling provided by the air intake system can be insufficient, and/or it may become necessary to overdimension the intake system, where that is done to the detriment of the aerodynamic performance of the vehicle.

BRIEF SUMMARY OF THE INVENTION

Consequently, an object of the invention is to provide a fluid intake system of the type described in the introduction that enables the fluid to be directed to a part of the vehicle in such a manner as to obtain effective cooling of that part.

This object is achieved by the fact that the duct includes at least one outlet orifice of section that is substantially elliptical with a ratio of the major diameter of the ellipse over its minor diameter being greater than 1.5. Below, this orifice is referred to as the "first" outlet orifice. The minor diameter and the major diameter are also known as the minor axis and the major axis of the ellipse.

The presence of an "outlet" orifice means that the fluid must leave the extraction duct by being ejected from the outlet orifice. This ejection is not a mere transfer of the fluid into another pipe situated downstream from the extraction duct; it requires the fluid to enter into an empty space of transverse dimensions that are considerably greater than the cross-section of the outlet orifice from the extraction duct. Conventionally, this empty space is the space containing the equipment that needs to be cooled by using the fluid collected by the fluid intake system.

Among all of the parameters that might serve to optimize the fluid intake system, it has been found that the shape of the outlet orifice performs a major and specific role in the behavior of the fluid conveyed by the intake system.

In particular, it has been found that an elliptical shape for certain orifices—and at least for the first outlet orifice—advantageously facilitates uniform diffusion of the fluid stream by avoiding the formation of turbulence in the vicinity of the walls of the duct. An elliptical shape does not have corners, unlike ducts of rectangular section, where such corners form zones that encourage the formation of turbulence.

Furthermore, and advantageously, the elliptical shape of the section of one or more outlet orifices is not incompatible with the extraction duct being flattened to a certain extent (or at least certain of its outlet branches being flattened): the ratio of the major diameter over the minor diameter of the ellipse may be greater than 3, and can even reach a value of 8 or even more. Because of this, the duct in the minor diameter direction remains quite small in size, thereby limiting problems of space occupation inside the wall of the vehicle to which the intake system is attached.

For an outlet orifice, choosing to have a section that is elliptical in shape thus enables the fluid leaving this orifice to be directed towards the part of the vehicle that is to be cooled both quickly and with maximum effectiveness. It thus enables the part of the vehicle to which the outgoing fluid stream is directed to be cooled effectively.

In a fluid intake system according to the invention, the scoop is a part that is attached to the inside of the wall. To enable the scoop to perform its fluid collection function, the wall presents an opening where the scoop is located.

The wall is generally substantially plane.

The scoop may be a scoop of the kind used in airplanes, and in particular a scoop of the flush type, i.e. a scoop that is set back and that does not project relative to the surface of the vehicle in which it is installed.

In an embodiment, the duct includes a "transfer" portion of section presenting an area that is constant or that increases progressively, in particular in substantially linear manner as a function of a curvilinear abscissa position along a neutral axis of the duct.

The term "neutral axis" is used herein to designate the curve passing through the barycenters (centers of gravity) of the various sections of the duct, as measured perpendicularly to the local direction of the duct.

The section of the transfer portion preferably increases from upstream to downstream with reference to the flow direction of the fluid through the air intake system.

The transfer portion may in particular extend from the inlet orifice, i.e. its upstream end is connected directly to the fluid collector.

Unlike the outlet orifice, the transfer portion may have a section that is substantially rectangular. It has been found that it is most particularly the last portion downstream of the extraction duct that plays a decisive role concerning the properties of the jet directed towards the part of the vehicle that is to be cooled.

Furthermore, in known fluid intake systems, the duct is generally of constant section. Consequently, the jet of fluid directed to the part of the vehicle that is to be cooled is a jet that is concentrated and at a speed that is relatively high. The jet is thus generally directed quite hard against the part(s) of the vehicle for cooling: unfortunately, such a jet is found to be relatively ineffective in terms of cooling.

In order to remedy that drawback, in an embodiment of the invention, the duct includes a diffuser:

that extends upstream from a "transition" section of the duct, of area $A_t$, to an outlet section; and that presents a section of area (A) that increases in convex manner as a function of curvilinear abscissa position (x) along a neutral axis of the duct, going from upstream to downstream.

The fact that the area A(x) of the section of the diffuser increases in convex manner means that the function A is a convex function. This shape for the curve representative of the area of the section of the diffuser advantageously enables the section of the fluid stream in the duct to be increased and enables the pressure in the fluid stream to be reduced. Consequently it enables the fresh air stream to be diffused at the outlet in a manner that is uniform and gentle against the part of the vehicle that is to be cooled.

(In this document, a section of the duct is a section of the duct in a plane perpendicular to the neutral axis of the duct.)

Preferably, the upstream end of the diffuser begins at or extends from the transfer portion. Thus, the diffuser provides a gentle transition from the transfer portion to the outlet of the duct.

In an embodiment, the extraction duct includes a plurality of outlet orifices.

Under such circumstances, a plurality of the outlet orifices and preferably all of them may be arranged to have sections that are elliptical in shape.

Under such circumstances, a plurality of outlet orifices may also present respective diffusers as defined above. This or these diffuser(s) may be arranged on downstream portions of the extraction duct having outlet orifices of section that may be elliptical or otherwise.

When the extraction duct has only one outlet orifice, the intake system of the invention may preferably have one or more of the following characteristics, taken in isolation or in combination:

The width of the duct may be substantially constant from the inlet orifice to the transition section. The width preferably increases. The width $L_t$ of the transition section then preferably satisfies:

$$L_i \leq L_t \leq 1.05 * L_i$$

or $$\text{only } 0.95 * L_i \leq L_t \leq 1.05 * L_i$$

where $L_i$ is the width of the section of the inlet orifice.

The area A of the section of the duct may be substantially constant, or preferably it may increase slightly going from the inlet orifice to the transition section, i.e. as far as the diffuser. Consequently, the area of the transition section may in particular satisfy:

$$1.03 A_i \leq A_t$$

where $A_i$ is the area of the section of the inlet orifice and $A_t$ is the area of the transition section.

The transition section may also preferably satisfy:

$$A_L \leq 1.09 A_i$$

In contrast, the area of the section of the duct necessarily increases (more or less quickly) within the diffuser. The area $A_o$ of the section of the outlet orifice from the diffuser preferably satisfies:

$$1.1 * A_t \leq A_o$$

It preferably also satisfies:

$$A_o \leq 10 * A_t$$

Finally, the flared shape of the diffuser preferably presents the following property: the angle of divergence formed between the two straight lines passing respectively on either side of the neutral axis of the duct via the outer limit points of the transition section and of the outlet orifice of the diffuser lies in the range 25° to 90° in every meridian plane.

BRIEF DESCRIPTION OF THE DRAWINGS

The invention can be well understood and its advantages appear better on reading the following detailed description of embodiments given as non-limiting examples. The description refers to the accompanying drawings, in which.

DETAILED DESCRIPTION OF THE INVENTION

Figure 1:
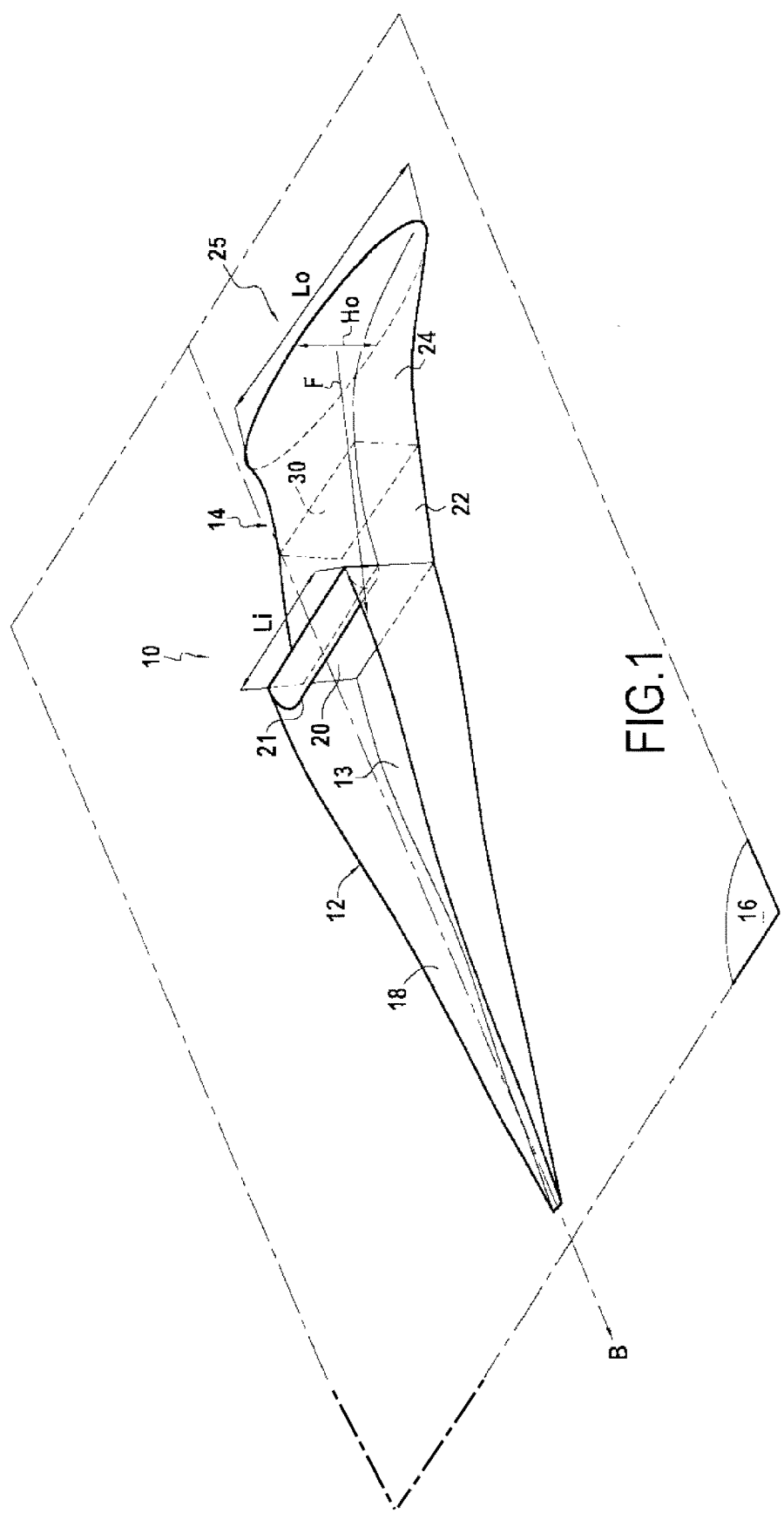
FIG. 1 is a diagrammatic perspective view of an intake system of the invention.
Figure 2:
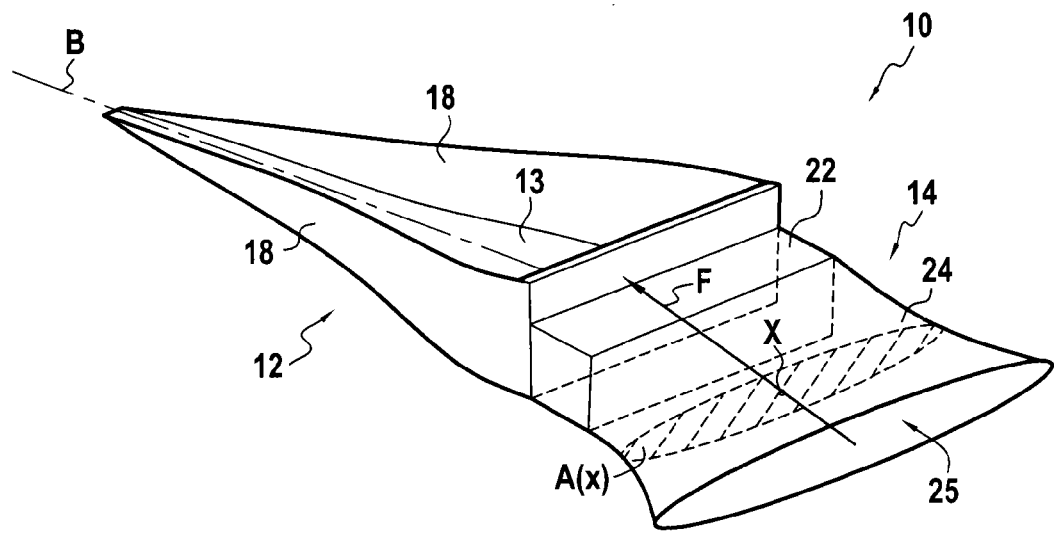
FIG. 2 is another diagrammatic perspective view of the FIG. 1 intake system.

The fluid intake system 10 of the invention is described with reference to FIGS. 1 to 5.

The system 10 comprises a fluid collector or scoop 12 and a fluid extraction duct 14.

The collector or scoop 12 is fastened to the inside surface of a wall 16. In the example shown, this wall is the wall of an airplane engine nacelle. The scoop 12 is a flush scoop of the National Advisory Committee for Aeronautics (NACA) shape that is conventional in aviation. It comprises an upstream fluid collection portion 18 and an air inlet orifice 20 of section presenting an area $A_i$.

The fluid collection portion 18 is in the form of a groove of increasing width formed in the wall 16.

At its downstream end (opposite end in the direction of arrow B), this groove 18 is defined:

at the surface of the wall 16 by the wall 16 itself which forms a leading edge 21;

below this leading edge 21, the groove opens out into the inlet orifice 20 of the fluid extraction duct 14, via which it feeds the duct with fluid.

The scoop 12 faces upstream in the direction B in which the engine advances through the air. Because of its shape, when the airplane is in flight, it collects ambient air and directs it to the air inlet orifice 20.

The duct 14 is arranged immediately downstream from the orifice 20. It receives the air collected by the scoop 12 and directs it towards the inside of the nacelle via a component that is to be cooled (not shown).

In a plane perpendicular to the travel direction of the airplane (axis X, FIG. 2), the air inlet orifice 20 has a section of rectangular shape and of area $A_i$, of height equal to about 20 millimeters (mm), and of width Li equal to about 70 mm in the example shown. Its height may lie in the range 10 mm to 50 mm, and its width in the range 40 mm to 300 mm, for example. Conventionally, the width of the air inlet orifice is equal to about four times its height. The area of the section 20 is dimensioned in particular as a function of the flow rate of air that it is desired to cause to pass through this section.

The duct 14 comprises two portions: at its upstream end, a so-called "transfer" portion 22; and downstream therefrom, a diffusion portion or diffuser 24. The section of the duct 14 at the upstream limit of the diffuser 24 is referred to as the "transition" section 30; it presents a width $L_t$ and an area $A_t$.

In the example shown, the transition section 30 is the downstream limit of the transfer portion 22.

Figure 4:
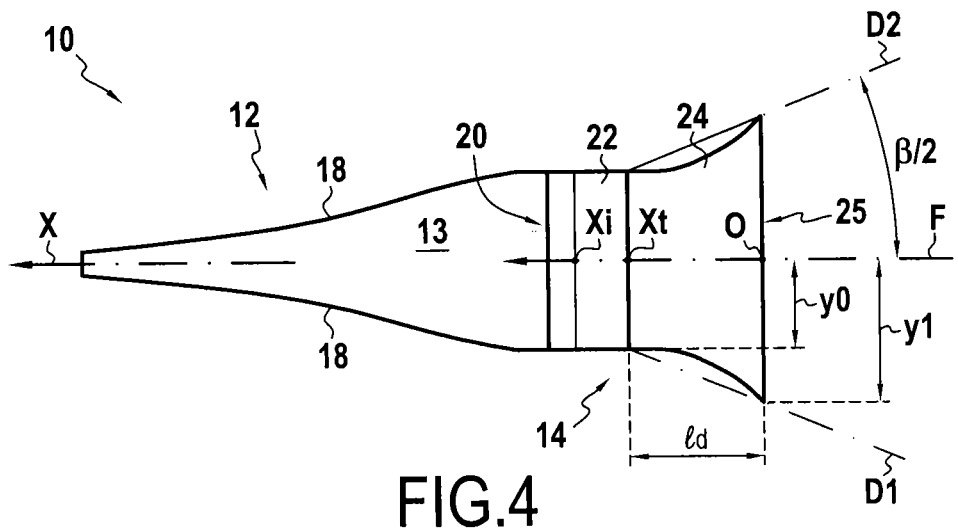
FIG. 4 is a diagrammatic plan view of the FIG. 1 intake system.
Figure 5:
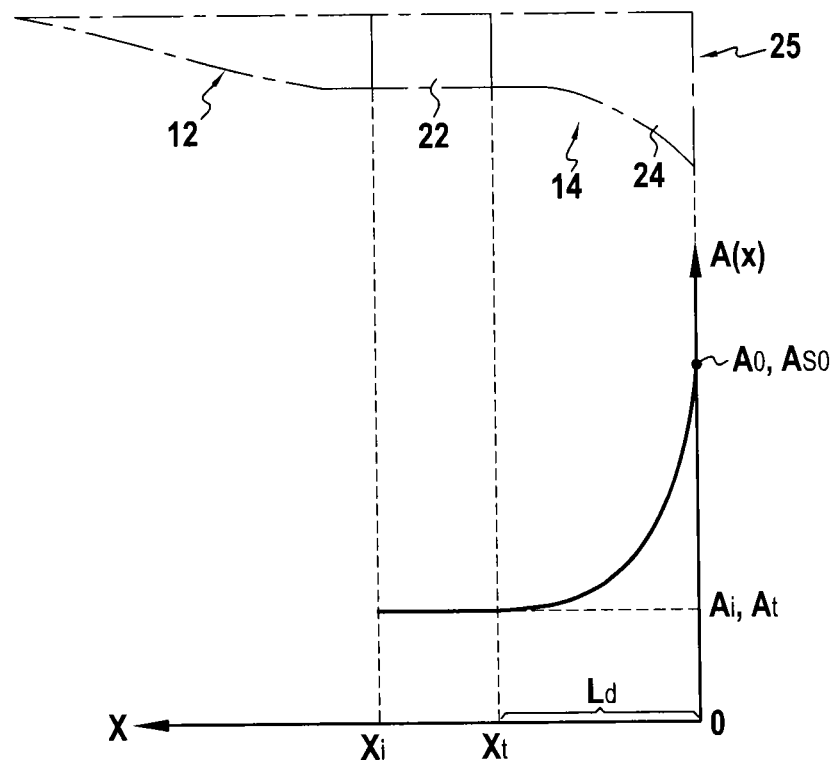
FIG. 5 is a graph plotting a curve showing variation in the distance between the limit of the section of the duct and the neutral axis of the duct as a function of curvilinear abscissa position along the duct.

Variations in the area A of the section of the duct 14 are plotted in FIG. 5, in association with FIG. 4. The area A is a function of curvilinear abscissa position X measured along the neutral axis F of the duct 14. In this embodiment, and moving in the fluid flow direction along the duct 14 from upstream to downstream, the abscissa position X conventionally decreases: the fluid begins by passing via the air inlet orifice 20 of section at abscissa position $X_i$; it then passes through the transition section 30 at abscissa position $X_t$ and is ejected from the air intake system at the outlet from the diffuser 24 at abscissa position X=0.

The following inequality thus applies:

$$X_i > X_t > 0$$

The transfer portion 22 serves to transport the fluid collected by the scoop 12 from the air inlet orifice to the diffuser 24; it may possibly be relatively long. It may also have one or more bifurcations, i.e. portions where the duct in the upstream to downstream direction splits into two or more ducts.

The area A of the section of the transfer portion 22 is generally relatively constant, and preferably increases slightly going from upstream to downstream. In the example shown, the area A is constant in the transfer portion 22 from abscissa position $X_i$ to abscissa position $X_t$.

The transfer portion 22 is rectangular in section. In the transfer portion 22, the area A of the duct increases linearly and very progressively from the area $A_i$ of the inlet orifice to the area $A_t$ of the transition section 30, which constitutes the downstream outlet from the transfer portion. The area of the transition section 30 preferably lies in the range 1.03 $A_i$ to 1.09 $A_i$.

Furthermore, the width $L_t$ of the transition section 30 is equal to the width $L_i$ of the inlet orifice, so:

$$L_t = L_i$$

After the transition section 30, the fluid penetrates into the diffuser 24, which is situated immediately downstream from the transfer portion 22. In the diffuser 24, the area A of the section of the duct 14 increases convexly as a function of curvilinear abscissa position X. It thus increases considerably more quickly than in the transfer portion 22.

The diffuser 24 extends downstream from the transfer portion 22. It is in the form of a flared horn and serves to diffuse the jet of fluid over a relatively large solid angle, given the relatively small section of the extraction duct.

The diffuser has a section that varies from an upstream end that is rectangular in shape (i.e. having the shape of the transition section 30), to an outlet orifice 25 that has a section that is elliptical in shape.

In the example shown, the outlet orifice is elliptical in shape with a large ratio of the major diameter Lo over the minor diameter Ho of the ellipse (FIG. 1), this ratio being about 6.

The area A of the diffuser expressed as a function of curvilinear abscissa position along a neutral axis of the duct increases continuously from upstream to downstream from the area $A_t$ of the transition section 30 to the area $A_o$ of the section of the outlet orifice.

The area A(x) of the section of the diffuser is a convex function. The curve representing it thus presents an upwardly rounded portion on the right-hand side of FIG. 5 between the curvilinear abscissa position $X_t$ (abscissa position of the transition section 30) and $X_o$ (abscissa position of the outlet orifice). This upwardly rounded shape differs from the straight shape (i.e. formed by a straight line segment) of the linearly curved portion presented by the transfer portion between abscissa position $X_i$ at the inlet orifice and abscissa position $X_t$.

Because the area increases in convex manner within the diffuser 24, the increase in section takes place more slowly upstream than it does downstream, thereby enabling the pressure gradient to remain constant along the channel, and thus reducing head losses by about 40% compared with a diffuser having straight walls.

Furthermore, the angle of divergence β is defined in a meridian plane as being the angle formed between the two straight lines (D1 and D2 in FIG. 4) passing via the limit points on the outsides of the transition section 30 and of the outlet orifice, respectively on either side of the neutral axis of the duct.

Whatever the meridian plane, within the diffuser 24 the angle of divergence β between the lines D1 and D2 remains within the range 25° to 90°.

Furthermore, the shape of the wall of the diffuser 24 is defined as follows.

The distance in the direction perpendicular to the neutral axis of the duct between the wall and the neutral axis of the duct, as a function of curvilinear abscissa position X is governed substantially by the following equation:

$$y = \frac{y1}{\sqrt[3]{1 + \frac{x}{\Box d} \cdot \left[\left(\frac{y1}{y0}\right)^3 - 1\right]}}$$

where:

x is the curvilinear abscissa position along the neutral axis of the duct, having the value $\Box d$ at the upstream section of the diffuser and 0 at the outlet orifice;

y is the radial distance in the meridian plane under consideration relative to the neutral axis; and y0 and y1 are the radial distances respectively at the transition section 30 at the upstream end of the diffuser ($x=X_t$) and at the outlet orifice of the diffuser (x=0).

At the transition section 30, the shape of the duct 14 is arranged so as to ensure tangent and curvature continuity between the walls of the transfer portion and the walls of the diffuser.

The value y1 is selected so that the area $A_o$ of the outlet orifice 25 remains in the preferred range 1.1 $A_t$ to 10 $A_t$. This makes it possible to avoid the ejection stream becoming separated, i.e. to avoid it being highly turbulent in the vicinity of the walls of the diffuser 24.

The term "ejection angle" is used to designate the limiting angle made between the neutral axis of the diffuser at the outlet orifice of the duct relative to the wall on which the intake system is fastened.

Figure 3:
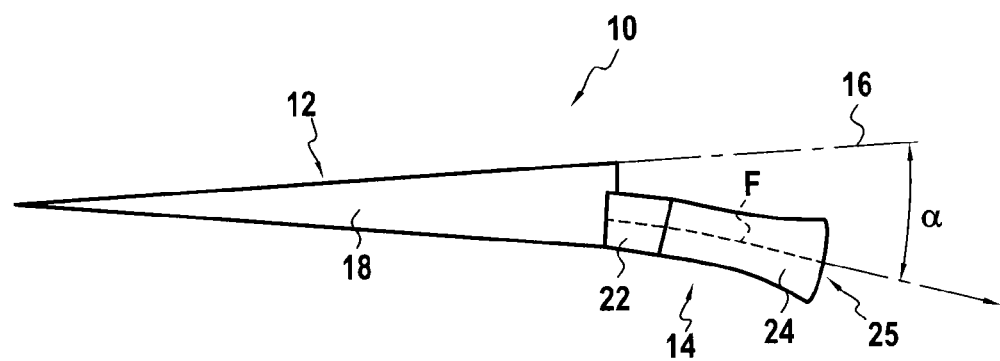
FIG. 3 is a diagrammatic side view of the FIG. 1 intake system.

Preferably, the ejection angle is small, and in particular less than 30°. Consequently, the neutral axis F of the duct also forms an angle that is small relative to the wall in which the intake system is arranged. The bottom 13 of the scoop 12 conventionally presents an angle close to 7° relative to the wall in which the intake system is fastened (FIG. 3).

Although in the example shown the extraction duct 14 presents only one outlet orifice, the present invention may be performed with an extraction duct 14 that presents one or more branches and consequently a plurality of outlet orifices.

Under such circumstances, the relationships between the area of the outlet section and the area of the inlet section of the duct 14 apply to the sum $A_{so}$ of the areas of the various outlet orifices (as contrasted with the area of any one of the various outlet orifices). The area $A_{so}$ of the total section of the outlet orifices thus preferably satisfies the following relationships:

$$A_{so} \geq 1.1 * A_i$$

and/or $$A_{so} \leq 10 * A_i$$

The invention claimed is:

1. A fluid intake system comprising:
   a fluid collector scoop designed to be fastened on an inside side of an opening arranged in an outer wall of a gas turbine engine in order to collect a fluid including ambient air flowing on an outside of the outer wall; and
   an extraction duct suitable for directing the fluid from an inlet orifice into said extraction duct to an outlet orifice from said extraction duct,
   wherein the fluid collector scoop is arranged so as to direct the fluid towards the inlet orifice of the extraction duct,
   wherein the outlet orifice comprises an elliptical section with a ratio of a major diameter of the elliptical section over a minor diameter of the elliptical section being between 1.5 and 8.0,
   wherein the extraction duct includes:
      a transfer portion having a first cross-sectional area that is constant or that increases in a linear manner as a first function of a curvilinear abscissa position along a neutral axis of the extraction duct, the first cross-sectional area of the transfer portion being rectangular, and
      a diffuser extending from a transition section of the extraction duct to an outlet section, the diffuser having a second cross-sectional area that increases in a convex manner from an upstream end to a downstream end as a second function of the curvilinear abscissa position along the neutral axis of the extraction duct, the second cross-sectional area of the diffuser being rectangular at the upstream end and elliptical at the downstream end.

2. The fluid intake system according to claim 1, wherein the transfer portion extends from the inlet orifice.

3. The fluid intake system according to claim 1, wherein the outlet orifice of the extraction duct is singular, wherein a first width $L_t$ of the transition section satisfies:

$$0.95 * L_i \leq L_t \leq 1.05 * L_i$$

where $L_i$ is a second width of the inlet orifice.

4. The fluid intake system according to claim 1, wherein the outlet orifice of the extraction duct is singular, wherein a third cross-sectional area $A_t$ of the transition section perpendicular to the neutral axis of the extraction duct satisfies:

$$A_t \leq 1.09 * A_i$$

where $A_i$ is a fourth cross-sectional area of the inlet orifice perpendicular to the neutral axis of the extraction duct.

5. The fluid intake system according to claim 1, wherein a third cross-sectional area $A_o$ of the outlet orifice of the diffuser perpendicular to the neutral axis of the extraction duct satisfies:

$$A_o \leq 10 * A_t$$

where $A_t$ is a fourth cross-sectional area of the transition section perpendicular to the neutral axis of the extraction duct.

6. The fluid intake system according to claim 1, wherein an angle of divergence formed between two straight lines passing respectively on either side of the neutral axis of the extraction duct via outer limit points of the transition section and of the outlet orifice of the diffuser lies in a range of 25° to 90°.

7. The fluid intake system according to claim 1, wherein a third cross-sectional area $A_{so}$ of a total section of said outlet orifice perpendicular to the neutral axis of the extraction duct satisfies:

$$A_{so} \leq 10 * A_i$$

where $A_i$ is a fourth cross-sectional area of the inlet orifice perpendicular to the neutral axis of the extraction duct.

* * * * *